US010228961B2

(12) United States Patent
Lipchuk et al.

(10) Patent No.: US 10,228,961 B2
(45) Date of Patent: Mar. 12, 2019

(54) LIVE STORAGE DOMAIN DECOMMISSIONING IN A VIRTUAL ENVIRONMENT

(71) Applicant: Red Hat Israel, Ltd., Raanana (IL)

(72) Inventors: Maor Lipchuk, Rishon Letzion (IL); Daniel Erez, Tel-Aviv (IL)

(73) Assignee: Red Hat Israel, Ltd., Raanana (IL)

( * ) Notice: Subject to any disclaimer, the term of this patent is extended or adjusted under 35 U.S.C. 154(b) by 0 days.

(21) Appl. No.: 15/183,411

(22) Filed: Jun. 15, 2016

(65) Prior Publication Data
US 2017/0364378 A1 Dec. 21, 2017

(51) Int. Cl.
*G06F 3/06* (2006.01)
*G06F 9/455* (2018.01)
*G06F 11/10* (2006.01)

(52) U.S. Cl.
CPC ........ *G06F 9/45558* (2013.01); *G06F 3/0617* (2013.01); *G06F 3/0632* (2013.01); *G06F 3/0664* (2013.01); *G06F 3/0683* (2013.01); *G06F 11/10* (2013.01); *G06F 2009/45562* (2013.01); *G06F 2009/45579* (2013.01)

(58) Field of Classification Search
CPC ........ G06F 9/45533–9/45558; G06F 13/4081; G06F 2009/45562–2009/45595; G06F 3/06–3/0689
See application file for complete search history.

(56) References Cited

U.S. PATENT DOCUMENTS

| | | | |
|---|---|---|---|
| 6,671,774 B1 * | 12/2003 | Lam ................... | G06F 3/0601 710/104 |
| 8,677,358 B2 | 3/2014 | Evans et al. | |
| 8,832,235 B1 | 9/2014 | Rozhin et al. | |
| 8,943,203 B1 | 1/2015 | Lent et al. | |
| 9,158,734 B1 | 10/2015 | Prabhakara et al. | |
| 9,274,907 B1 | 3/2016 | Bachu et al. | |
| 9,277,002 B2 | 3/2016 | Gupta et al. | |
| 2011/0271069 A1 * | 11/2011 | Manmohan ......... | G06F 11/2028 711/163 |
| 2012/0254861 A1 * | 10/2012 | Down, Jr. ........... | G06F 9/45558 718/1 |
| 2014/0047144 A1 * | 2/2014 | Haga .................... | G06F 3/0605 710/74 |
| 2014/0068607 A1 * | 3/2014 | Tsirkin ................ | G06F 9/45558 718/1 |

(Continued)

OTHER PUBLICATIONS

"StoragePool Metadata Removal", 2013-2016 oVirt, 16 pages.

(Continued)

*Primary Examiner* — Nicholas J Simonetti
(74) *Attorney, Agent, or Firm* — Lowenstein Sandler LLP (57) ABSTRACT

Implementations of the disclosure provide for live storage domain decommissioning in a virtual environment. A method of the disclosure includes identifying, by a processing device, a storage domain to decommission from a storage system. The storage domain comprises a plurality of disk images. It is determined whether the disk images are associated with a virtual machine. Thereupon, the disk images are hot-unplugged from the virtual machine. Responsive to detecting that the disk images are unplugged from the virtual machine, the disk image is deleted from the storage domain and the storage domain is removed from the storage system.

20 Claims, 6 Drawing Sheets

(56) References Cited

U.S. PATENT DOCUMENTS

| | | |
|---|---|---|
| 2014/0130055 A1 | 5/2014 | Guha |
| 2014/0157363 A1* | 6/2014 | Banerjee ............. G06F 9/45558 726/2 |
| 2014/0208319 A1* | 7/2014 | Yoshimura .............. G06F 21/53 718/1 |
| 2014/0282511 A1* | 9/2014 | Zheng ................. G06F 9/45558 718/1 |
| 2015/0242224 A1* | 8/2015 | Simoncelli .......... G06F 9/45533 718/1 |

OTHER PUBLICATIONS

Johan Kooij Man, "[ovirt-users] Delete disk references without deleting the disk", Jan. 6, 2016, 3 pages.
"Decommission Master Domain and SPM", oVirt, 16 pages.
"What's your VM decommission process?", Jul. 22, 2014, 3 pages.

* cited by examiner

LIVE STORAGE DOMAIN DECOMMISSIONING IN A VIRTUAL ENVIRONMENT

TECHNICAL FIELD

The implementations of the disclosure relate generally to data storage management and, more specifically, live storage domain decommissioning in a virtual environment.

BACKGROUND

The virtualization of a data center results in an abstraction of a physical system to consolidate the data center infrastructure and increase operational efficiencies. A virtual machine (VM) may be a software-based emulation of computer hardware. For example, the VM may operate based on computer architecture and functions of computer hardware resources associated with hard disks or other such memory. The VM may emulate a physical computing environment, but requests for a hard disk or memory may be managed by a virtualization layer of a host machine to translate these requests to the underlying physical computing hardware resources. This type of virtualization results in multiple VMs sharing physical resources.

BRIEF DESCRIPTION OF THE DRAWINGS

The disclosure can be understood more fully from the detailed description given below and from the accompanying drawings of various implementations of the disclosure. The drawings, however, should not be taken to limit the disclosure to the specific implementations, but are for explanation and understanding only.

The disclosure is illustrated by way of examples, and not by way of limitation, and may be more fully understood with references to the following detailed description when considered in connection with the figures, in which.

DETAILED DESCRIPTION

The disclosure provides techniques for live storage domain decommissioning in a virtual environment. The virtual environment may include a plurality of host computer systems managed by a virtualization manager. Each host computer system (also referred to herein as a "host") may be communicatively coupled, via a network, to one or more storage domains that store disk images of a virtual machine (VM). The VM may reference a virtual disk (also referred to as a disk image) that comprises one or more volumes. Each host computer system (also referred to herein as a "host") may be communicatively coupled, via a network, to one or more storage domains that store disk images of the VMs.

"Storage domain" herein refers to an atomic storage unit, such as a mount point or a folder for a file based storage, or a group of logical unit numbers (LUNs) for a block-based storage. A storage domain may comprise one or more block devices, one or more storage devices, one or more file systems, one or more volumes, and/or portions thereof. The storage domains may be employed for storing one or more of the virtual disks or disk images for the VMs.

In some situations, a particular storage domain may need to be decommissioned or otherwise removed. In one example, there could be a malfunction that causes a specific storage domain to be slower than normal. In this case, the performance of the entire system may benefit from removing the malfunctioning domain. In another example, a storage domain can be removed so that it can be used for testing new features, such as a feature for backing up VMs by persisting the VMs' data on a storage domain. In yet another example, the domain may become obsolete because it contains only stale/non-crucial/unimportant disks. The obsolete domain may be removed in order to gain the storage space back. In such cases, the obsolete storage domain can be decommissioned and data migrated to a newer storage (e.g., bare-metal) domain.

To decommission a storage domain, all of the VMs associated with the domain typically have to be shutdown beforehand to any avoid data corruption. Because of all of the VMs are shut down, the system may experience significant downtime. For example, there can be numerous VMs to be shut down due to the decommissioning of the storage domain, which can take an extended period of time and in some cases days to complete.

In accordance with the disclosure, techniques are provided to decommission a storage domain while reducing the system impact by minimizing, if any, VM down time in a system, for example, at a data center. In some implementations, upon receiving a request to decommission a specific storage domain, the techniques disclosed herein may allow the system to find all of the disk images or disks on that specific storage domain. At that point, the disk images are grouped into categories, such as categories of VMs associated with the disks. A first category of VMs associated with the disks may include disks that are plugged into non-running VMs or no VM at all. In this case, the disks associated with the first category of VMs are unplugged from the VMs. For example, the system may initiate a hot removal command that causes an operating system running in the VM to un-mount or otherwise un-map the disk image from the VM. Since the VMs associated with this first category may not be running, the disks may be just unmapped from the VM. When all of the disk images are unplugged from the domain, the disk images are then deleted and the storage domain is removed from the system.

A second category of VMs associated with the disks may include disks that are plugged into a running or active VM, for example, there may be some operation that is in progress on the disks. As such, the system may receive an indication from the VM that the hot removal command for the disks has failed. In case of failure, the system may generate a prompt to suggest to a user to power off the VM associated with the second category of VMs. In case there is an operation in progress on the disks, the system invokes a cancellation command on these disks that ensures a proper closure/cleanup of any memory that may have been used in the operation. The system repeatedly polls the status of these disks. When the disks are in an 'appropriate' status for removal, the system can then delete the disk image and remove the storage domain from the system. For example, to put the disks in an 'appropriate' status for removal, the cancellation command may cleanup the memory used by the disks and unmounts the disks from the VM's.

In an alternative situation, a third category of VMs associated with the disks may include disks that are shared between a combination of running (e.g., first category) and non-running (e.g., second category) VMs. If the system determines that the relevant VMs associated with the disks are not running, then the disk can be hot-unplugged from the VMs and subsequently deleted. If any of the VMs are running, the system may attempt to hot-unplug the disks from an entire set of VMs simultaneously. In case of failure, the system may generate a user prompt to suggest to the users certain alternatives (e.g., shutting down of the VMs) so that the disks can be un-plugged and removed from the storage domain. Upon removing the entire set of disks on the storage domain, the system can then delete the domain and reclaim the storage space back without any VM down time at the data-center.

Figure 1:
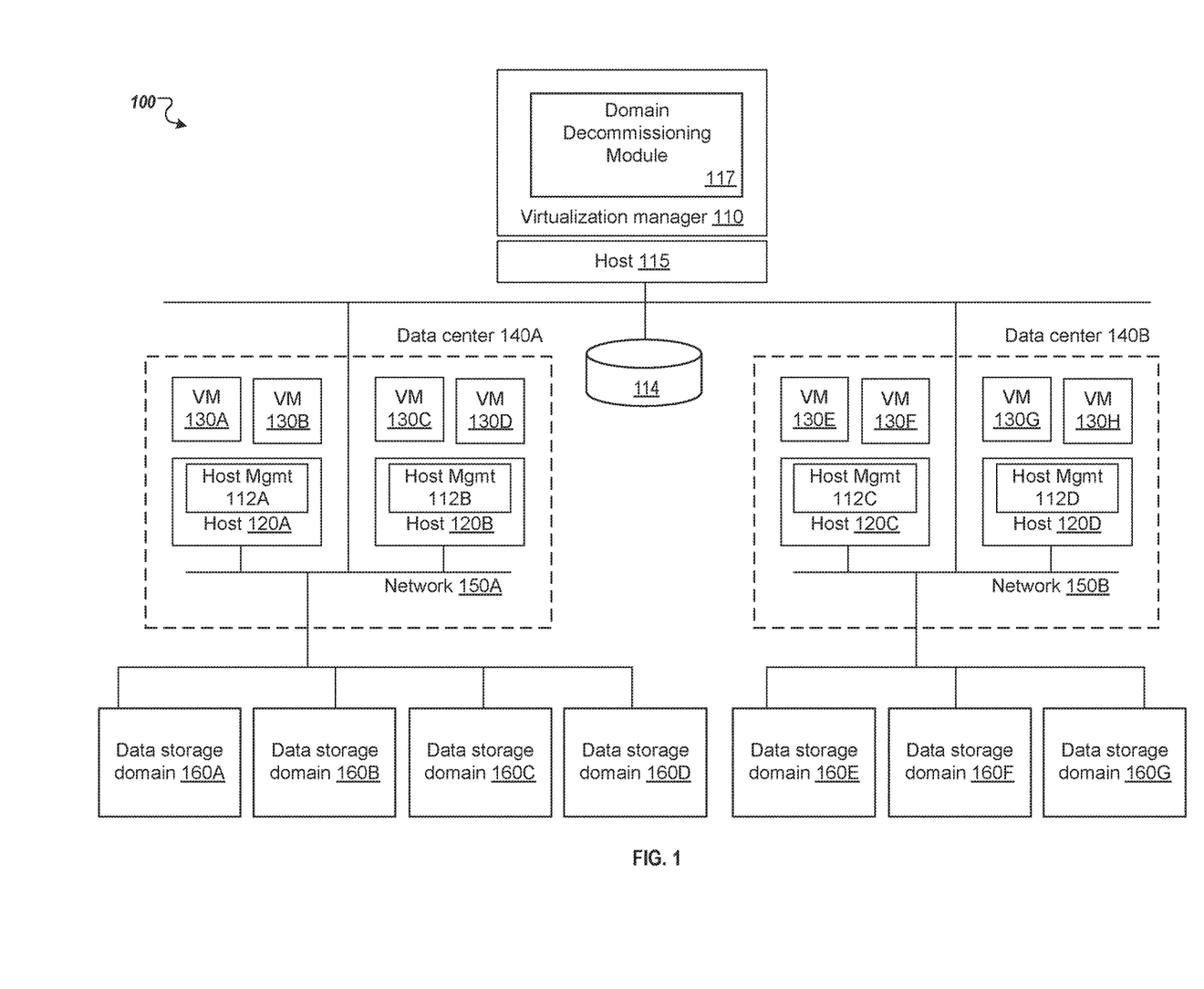
FIG. 1 is a block diagram of a distributed computer system representing a virtualized environment in which implementations of the disclosure may operate.

FIG. 1 is a block diagram of a distributed computer system 100 representing a virtualized environment. In the illustrative example of FIG. 1, computer system 100 comprises a virtualization manager 110 and a plurality of host computer systems 120A-120D grouped into one or more logical groups which may be also referred to as "data centers" 140A-140B. Virtualization manager 110 refers to one or more software modules being executed by a host computer system 115 for centralized management of the virtualized environment. Virtualization manager 110 may comprise various interfaces, including administrative interface, reporting interface, and/or application programming interface (API) to communicate to host computers 120A-120D of the managed virtualized environment, as well as to user portals, directory servers and various other components which are omitted from FIG. 1 for clarity.

In one implantation, the virtualization manager 110 may access a database 114, which may run on the host computer system 115 or in a separate database server (not shown). Database 114 may, e.g., be a relational database, an object-oriented database, an object-relational database, etc. The database 114 may store data, e.g., configurations, settings, and status related to VM host computer systems 120A-120D and references (e.g., IP addresses) of the data storage domains 160A-160G as well as other relevant information.

Each of the host computer systems 115, 120A-120D may comprise one or more processors communicatively coupled to memory devices and input/output (I/O) devices, as described in more details herein below with references to FIG. 6. Each of host computer systems 115, 120A-120D may run a plurality of virtual machines 130A-130H, by executing a hypervisor to abstract the physical layer, including processors, memory, and I/O devices, and present this abstraction to the virtual machines as virtual devices.

Each of the virtual machines 130A-130H may execute a guest operating system which may utilize the underlying virtual devices, including virtual processors, virtual memory, and virtual I/O devices. One or more applications may be running on the virtual machines 130A-130H under the guest operating system.

Each of the host computer systems 120A-120D may run a host management module 112A-D that manages and monitors various aspects of the host operation, including the storage, memory and network interfaces. In an illustrative example, host management modules 112A-D may be provided by a Virtual Desktop and Server Management (VDSM) daemon.

In certain implementations, host computer systems 120A-120D may be grouped into one or more logical groups which may be also referred to as "data centers" 140A-140B. A data center may represent the highest level of abstraction in the virtualization model. Each data center 140 may be communicatively coupled, via a network 150A-150B, to one or more storage domains, including data storage domains 160A-160G. The data storage domains 160A-160G may store disk images (not shown) of virtual machines 130A-130H. In some situations, the virtualization manager 110 may receive a request to decommission t one or more of the data storage domains 160A-160G. For example, one or more of the data storage domains 160A-160G the may be decommissioned because they have become obsolete or are malfunctioning.

In accordance with one or more aspects of the disclosure, virtualization manager 110 may comprise a domain decommissioning module 117 to facilitate operations of the computer system 100 for decommissioning live storage domains (e.g., data storage domains 160A-160G). The functionally of the domain decommissioning module 117 can exist in a fewer or greater number of modules than what is shown, with such modules residing at one or more processing devices of computer system 100, which may be geographically dispersed. The module 117 may be operable in conjunction with virtualization manager 110 from which it may receive and determine relevant information regarding the data storage domains 160A-160G and any active virtual machines 130A-130H associated with those domains in the virtual environment. Thereupon, the domain decommissioning module 117 may decommission a domain without adversely impacting performance of the computer system 100 as discussed in more detail below with respect to FIGS. 2 through 6.

Figure 2:
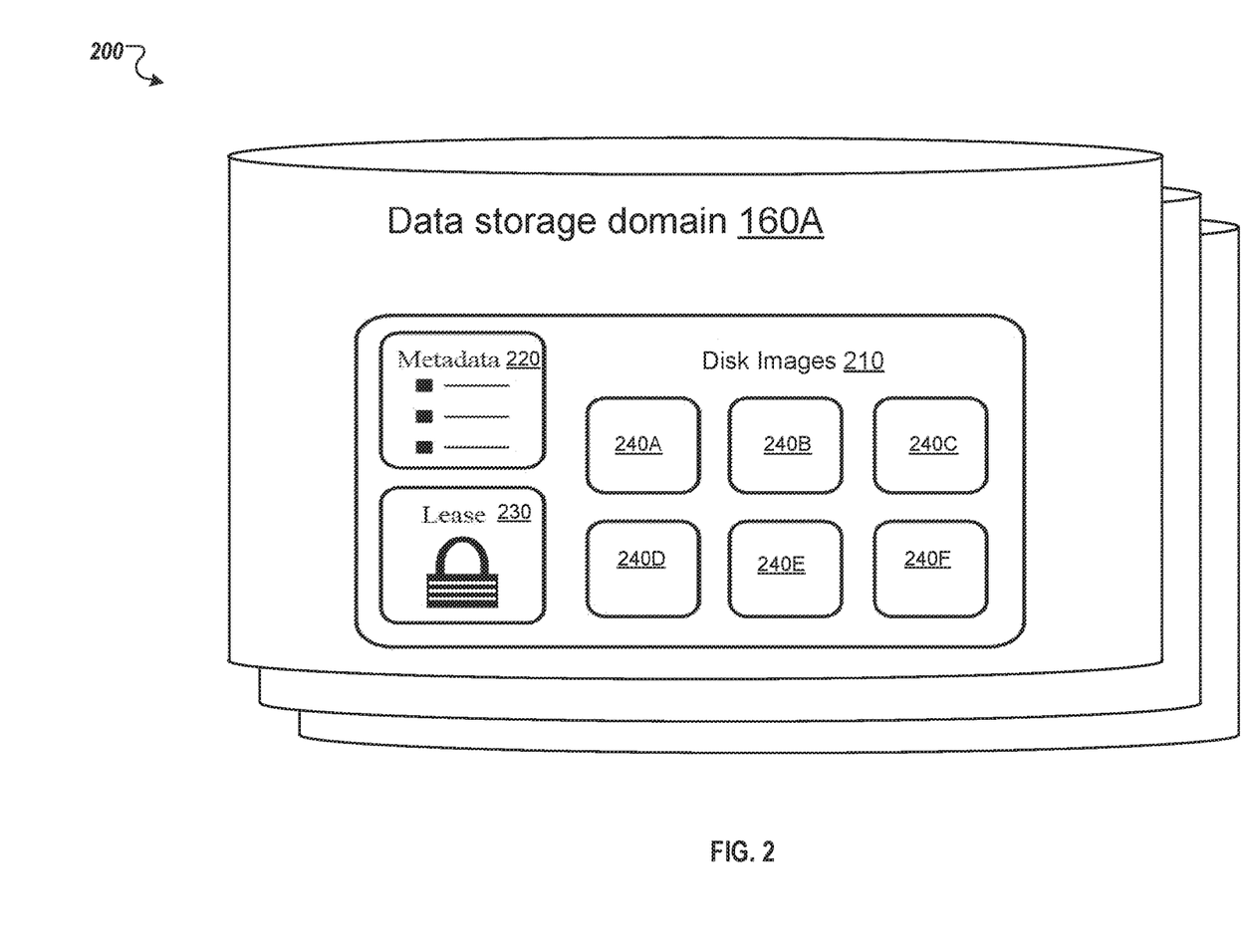
FIG. 2 illustrates an example functional structure of a storage domain in accordance with one or more aspects of the disclosure.

FIG. 2 illustrates an example functional structure 200 of a storage domain, such as data storage domain 160A of FIG. 1, in accordance with one or more aspects of the disclosure. The functional structure 200 may be employed for storing one or more virtual machine disk images 210, metadata 220 and lease area 230. In an illustrative example, example storage domain 160A may employ file-based storage, in which case disk images 210, domain metadata 220, and a domain lease 230, provided by respective files. In another illustrative example, example storage domain 160A may employ block-based storage, in which case disk images 210, metadata 220, and a lease area 230, provided by respective logical volumes.

Each disk image 210 (also referred to as a virtual disk) may comprise one or more volumes 240A-190N, as schematically illustrated by FIG. 1, for storing disk image data. In an illustrative example, a disk image may represent a volume chain comprising one or more copy-on-write (COW) volumes (which may also be referred to as "layers"). From the perspective of a virtual machine, these volumes 240A-240F appear as a single disk image, as the hypervisor presents the virtual disk to a virtual machine and implements the associated disk read-write operations. The virtual disk device implemented by the hypervisor locates the data by accessing, transparently to the virtual machine, each volume of the volume chain, starting from the most recently added volume.

Metadata 220 may be employed for storing references to associated volumes (e.g., to parent or child volumes in a copy-on-write chain) and/or other information that may be utilized for volume identification, management, creation, modification, removal, and/or for performing file operations with respect to the data stored on the volumes 240A-240F.

The lease area 230 may be employed for storing the information that may be utilized for managing access to the volumes 240A-240F. In certain implementations, by obtaining a lease with respect to example storage domain 160A, a host system may receive an exclusive access to the volumes 240A-240F on the storage domain that would prevent other hosts from accessing the volumes while the lease is active. A lease may have a certain expiration period and may be extended by the requestor. Failure to timely extend a lease 230 may lead to the expiration of the lease 230. The state of the current lease with respect to a given storage domain may be stored in the lease area 230 of that storage domain.

Figure 3:
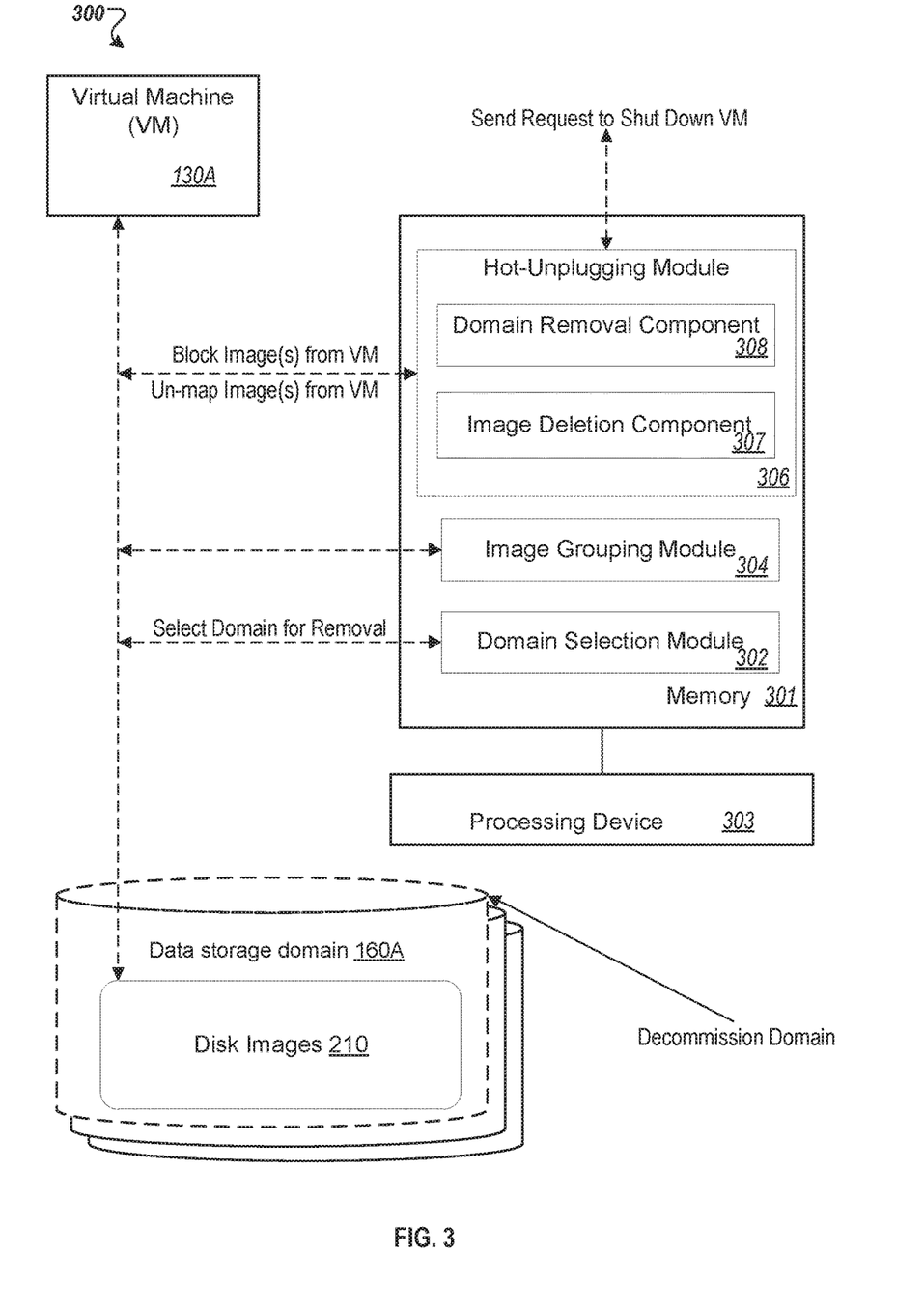
FIG. 3 is a block diagram of a system including a memory to support live storage domain decommissioning in a virtual environment according to an implementation of the disclosure.

FIG. 3 is a block diagram of a system 300 including a memory 301 to support live storage domain decommissioning in a virtual environment according to an implementation of the disclosure. In this example, the system includes a processing device 303 coupled to the memory 301. In some implementations, the memory 301 and processing device 303 may correspond to a memory and processing device within system architecture 100 of FIG. 1. For example, host 115 of the distributed system 100 may comprise the memory 301 and processing device 303. The processing device 303 may execute instructions stored in the memory for carrying out the operations of the components and module as discussed herein.

In some implementations, the system 300 may include components and modules that allow a system user, such as an administrator, to remove certain live domains without severally impacting the system 300. As shown in FIG. 3, these components may include a domain selection module 302, an image grouping module 304, a hot-unplugging module 306 that includes an image deletion component 307 and a domain removal component 308. The memory 301 may include any non-persistent data storage (e.g., memory), persistent data storage (e.g., flash storage, hard drive, tape), other medium, or combination thereof that is capable of storing instructions for carrying out the operations of the components and module as discussed herein.

Domain selection module 302 may select a storage domain to decommission from a storage system. For example, upon receiving a request to decommission a specific storage domain, the domain selection module 302 may identify that domain from amongst the domains in the system 300. In some implementations, domain selection module 302 may select a storage domain to decommission based on a defined selection criterion. For example, performance of the domains may be monitored to determine if they are functioning within a threshold range. If particular domains fall below this threshold, they may be selected by the domain selection module 302 to be decommissioned. In alternative implementations, the domain selection module 302 may select domains that have become obsolete or only used for testing or various other types of criterion may be used for selecting the storage domains to decommission.

Image grouping module 304 may identify the disk images on the specific storage domain selected for removal. For example, if data storage domain 160A is selected for removal, the image grouping module 304 may identify that disk images 210 are on that domain. In some instances, the data storage domain 160A may identify the disk images 210 based on the references stored in metadata of the data storage domain 160A, such as metadata 220 of FIG. 2. As noted above, the metadata 220 may be employed for storing references to associated volumes of a disk image and/or other information that may be utilized identification.

Once the disk images 210 on the domain are identified, the image grouping module 304 may determine whether the disk images 210 are associated a VM, such as virtual machine 130A, that has a particular status. Based on the particular status of the VM, the image grouping module 304 may classify and group the disk images 210 into a first category (e.g., non-running VMs) or a second category (e.g., running VMs) of disks.

In some implementations, the first category may indicate, for example, that the disk images 210 are plugged into a non-running VM or the disk images 210 are not plugged into any VM. In other implementations, the second category may indicate, for example, that disk images 210 are plugged to a running (e.g., active) VM, or that the disk images 210 are in a locked status (e.g., a lease may be held by a host with respect to a volume of the disk image) or the disk images 210 may be shared between a combination of running and non-running VMs. If the disk images 210 are shared between several VMs, the image grouping module 204 may group a portion of the disk images 210 into a first set where all the related VMs are associated with the first category (e.g., non-running VMs). The other portion of the disk images 210 may be grouped into a second group where all the related VMs are associated with the second category (e.g., running VMs).

Hot-unplugging module 306 may attempt to hot-unplug the disk images 210 from the VM 130A. For example, the hot-unplugging module 306 may initiate a hot removal command that causes an operating system associated with the VM 130A to un-mount or the disk images 210 from the VM 130A. In some implementations, the hot-unplugging module 206 may block access to the disk images 210 from the VM 130A. In one implementation, the hot-unplugging module 306 may execute a command (e.g., a freeze command) that blocks the VM 130A from being able to write data to the disk images 210. For example, the executed command may instruct the virtualization manager 110 to block the VM's access to the disk image. The block access ensures the VM does not at the same time try to write data to an image that the hot-unplugging module 306 is attempting to unplug.

If the disk images 210 are associated with the first category (e.g., non-running VMs) of disks, the hot removal command should succeed upon execution, thereby un-plugging the disk images 210 from the VM 130A. If the disk images 210 are associated with the second category (e.g., running VMs) of disks, the hot removal command may fail upon execution. For example, in response to the hot-unplugging module 306 attempting to un-plug the disks from an active VM, the operating system associated with the VM may generate a failure alert. In case of failure, the hot-unplugging module 306 may generate a prompt to request that active VM is shutdown. In one implementation, the hot-unplugging module 306 may provide an option prompt that alerts a user to the failure and request if the user wishes to continue or stop decommissioning of the storage domain. In some implementations, the hot-unplugging module 306 may repeatedly attempt to execute the hot removal command, after a period of time, until the command succeeds.

Image deletion component 307 may delete the disk images (e.g., disk images 210) from the storage domain (e.g., data storage domain 160A). For example, the image deletion component 307 may delete an identifier reference to the disk images 210 in metadata (e.g., metadata 220) associated with the storage domain 160A. If there was an operation in progress on the disk images 210, the image deletion component 307 may execute a cancellation command on these disks. The cancellation command ensures a proper closure/cleanup of memory used by the disk images 210.

Domain removal component 308 may remove the storage domain, such as data storage domain 160A from the system 300. For example, the domain removal component 308 may remove a reference, such as an IP address, to the domain 160A from a database associated with the system 300, such as database 114 of FIG. 1. In some implantations, the system 300 can then reclaim the storage space associated with the storage domain 160A for reallocation or other uses.

Figure 4:
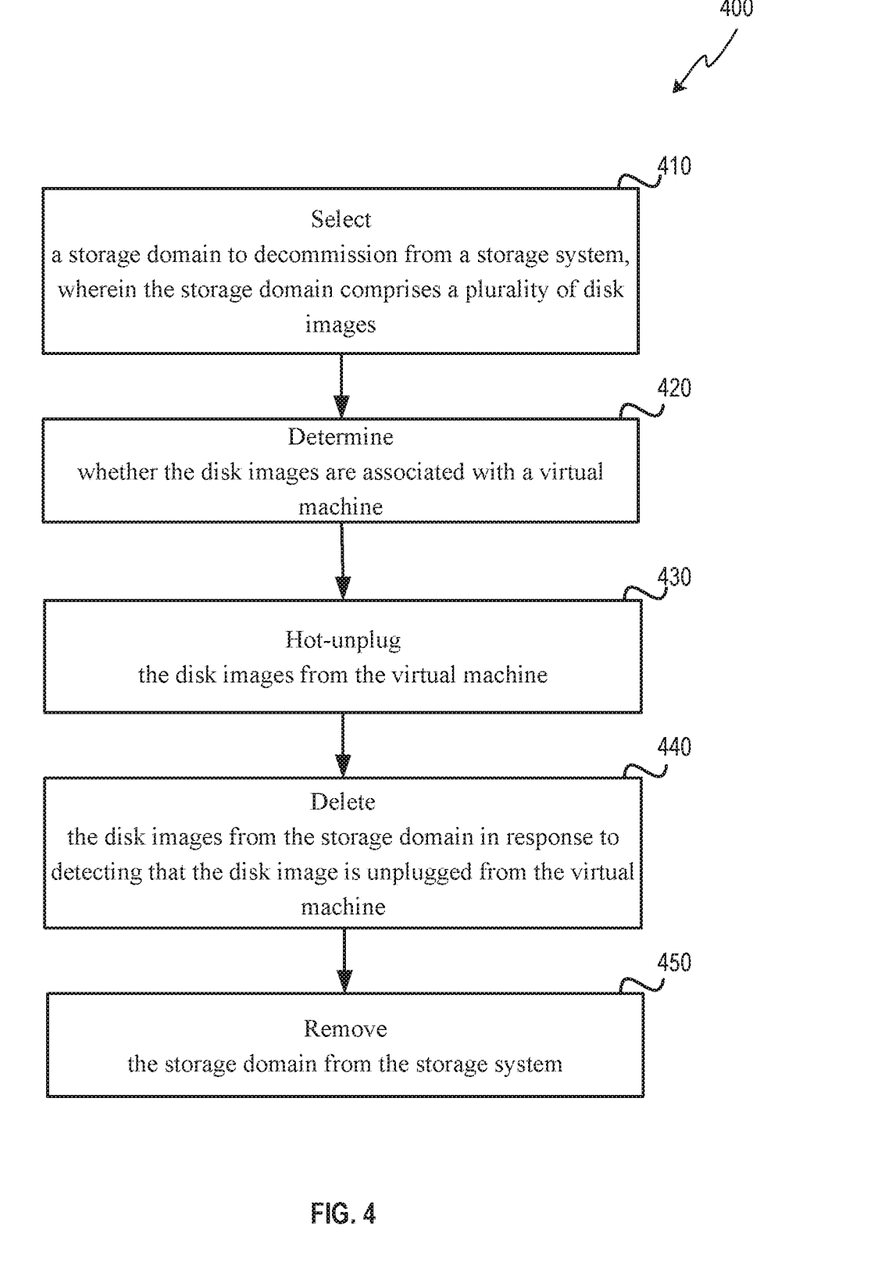
FIG. 4 illustrates a flow diagram illustrating a method of live storage domain decommissioning in a virtual environment according to an implementation of the disclosure.

FIG. 4 illustrates a flow diagram illustrating a method 400 of live storage domain decommissioning in a virtual environment according to an implementation of the disclosure. In one implementation, the domain decommissioning module 117 of FIG. 1 may perform method 400. The method 400 may be performed by processing logic that may comprise hardware (circuitry, dedicated logic, etc.), software (e.g., software executed by a general purpose computer system or a dedicated machine), or a combination of both. In alternative implementations, some or all of the method 400 may be performed by other components of a shared storage system. It should be noted that blocks depicted in FIG. 4 can be performed simultaneously or in a different order than that depicted.

Method 400 begins at block 410 where a storage domain to decommission from a storage system is selected. The storage domain comprises a plurality of disk images. In block 420, a determination is made as to whether the disk image is associated with a virtual machine. In block 430, the disk images are hot-unplugged from the virtual machine. For example, the source system may initiate a hot-removal operation that attempts to un-mount the disk-images from the virtual machine. Responsive to detecting that the disk images are unplugged from the virtual machine, the disk image is deleted from the storage domain in block 440. In block, 450 the storage domain is removed from the storage system.

Figure 5:
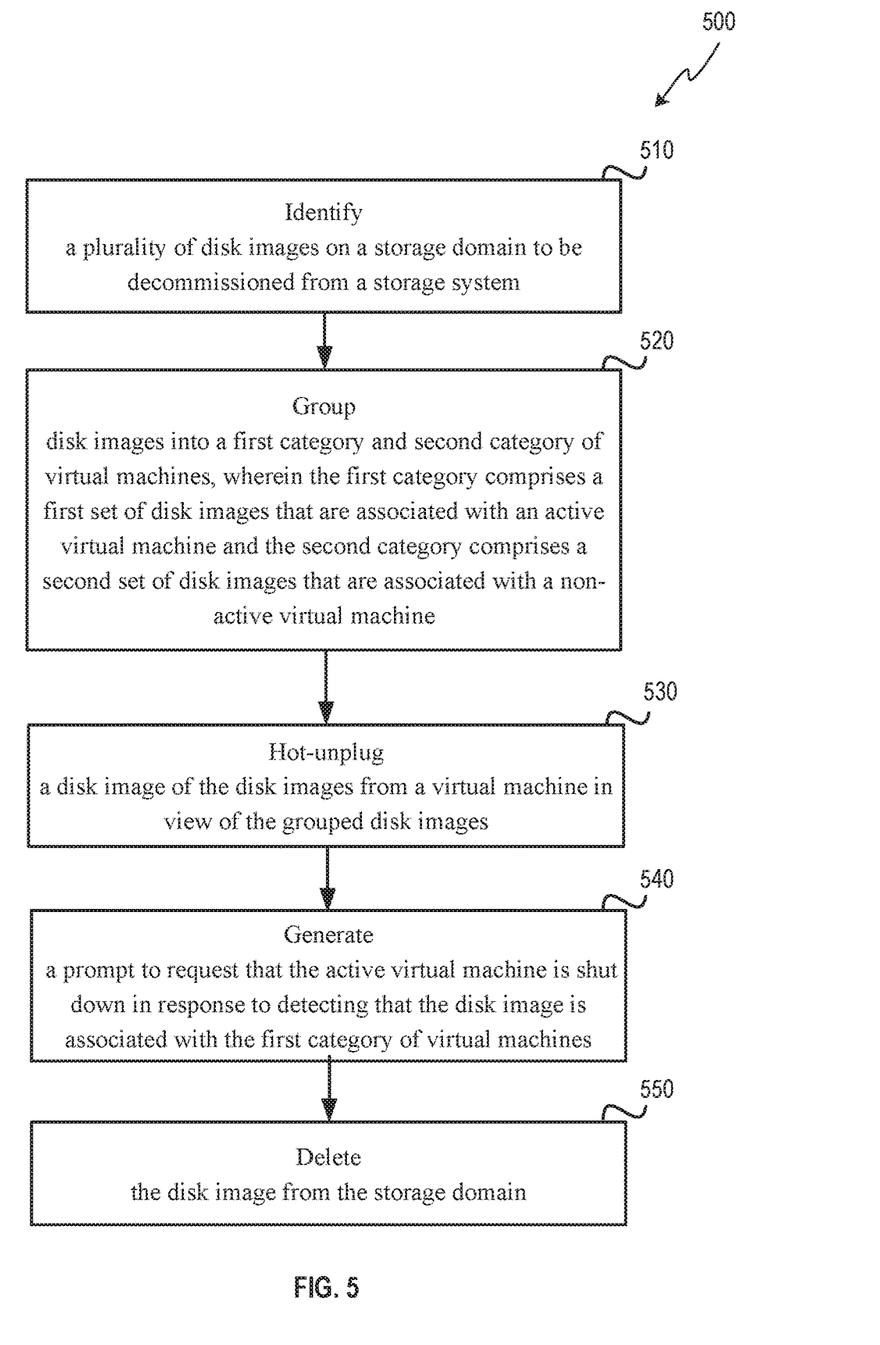
FIG. 5 illustrates a flow diagram illustrating another method of live storage domain decommissioning in a virtual environment according to an implementation of the disclosure.

FIG. 5 illustrates a flow diagram illustrating another method 500 of live storage domain decommissioning in a virtual environment according to an implementation of the disclosure. In one implementation, the domain decommissioning module 117 of FIG. 1 may perform method 500. The method 500 may be performed by processing logic that may comprise hardware (circuitry, dedicated logic, etc.), software (e.g., software executed by a general purpose computer system or a dedicated machine), or a combination of both. In alternative implementations, some or all of the method 500 may be performed by other components of a shared storage system. It should be noted that blocks depicted in FIG. 5 can be performed simultaneously or in a different order than that depicted.

Method 500 begins at block 510 where a plurality of disk images on a storage domain to be decommissioned from a storage system is identified. In block 520, the disk images are grouped into a first category and second category of virtual machines. The first category comprises a first set of disk images that are associated with an active virtual machine. The second category comprises a second set of disk images that are associated with a non-active virtual machine. In block 530, a disk image of the disk images is hot-unplugged from a virtual machine in view of the grouped disk images. In block 540, a prompt is generated to request that the active virtual machine is shut down in response to detecting that the disk image is associated with the first category of virtual machines. Then, the disk image is deleted from the storage domain. When all of the grouped disk images are unplugged from the storage domain, the storage domain is then removed from the storage system.

Figure 6:
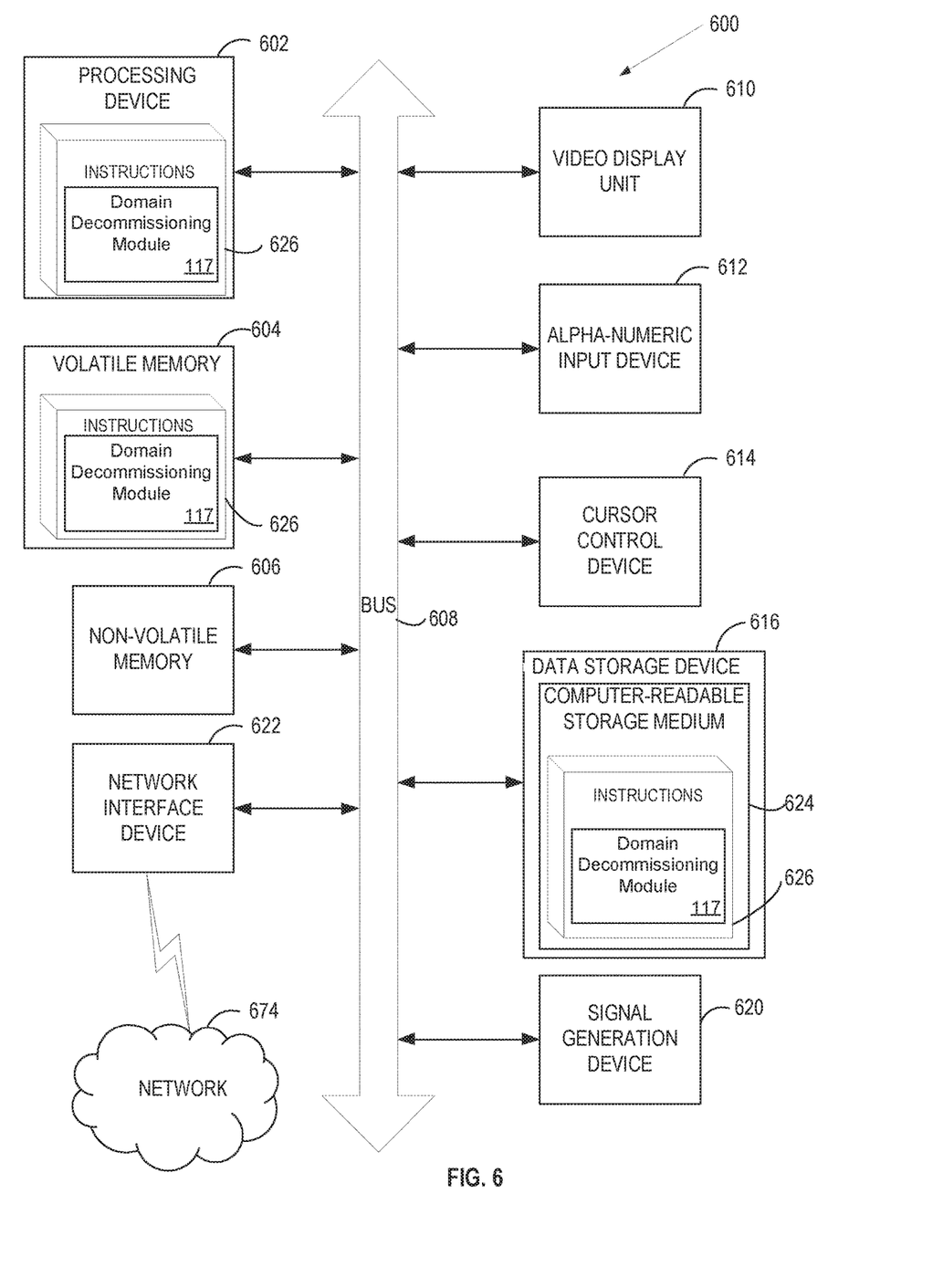
FIG. 6 illustrates a block diagram illustrating a computer system in which implementations of the disclosure may be used.

FIG. 6 depicts a block diagram of a computer system operating in accordance with one or more aspects of the present disclosure. In various illustrative examples, computer system 600 may correspond to a processing device within system 100 or system 300 of FIG. 1 and FIG. 3 respectively. The computer system may be included within a data center that supports virtualization. Virtualization within a data center results in a physical system being virtualized using virtual machines to consolidate the data center infrastructure and increase operational efficiencies.

A virtual machine (VM) may be a program-based emulation of computer hardware. For example, the VM may operate based on computer architecture and functions of computer hardware resources associated with hard disks or other such memory. The VM may emulate a physical computing environment, but requests for a hard disk or memory may be managed by a virtualization layer of a host machine to translate these requests to the underlying physical computing hardware resources. This type of virtualization results in multiple VMs sharing physical resources.

In certain implementations, computer system 600 may be connected (e.g., via a network, such as a Local Area Network (LAN), an intranet, an extranet, or the Internet) to other computer systems. Computer system 600 may operate in the capacity of a server or a client computer in a client-server environment, or as a peer computer in a peer-to-peer or distributed network environment. Computer system 600 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein for live storage domain decommissioning.

In a further aspect, the computer system 600 may include a processing device 602, a volatile memory 604 (e.g., random access memory (RAM)), a non-volatile memory 606 (e.g., read-only memory (ROM) or electrically-erasable programmable ROM (EEPROM)), and a data storage device 616, which may communicate with each other via a bus 608.

Processing device 602 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 600 may further include a network interface device 622. Computer system 600 also may include a video display unit 610 (e.g., an LCD), an alphanumeric input device 612 (e.g., a keyboard), a cursor control device 614 (e.g., a mouse), and a signal generation device 620.

Data storage device 616 may include a non-transitory computer-readable storage medium 624 on which may store instructions 626 encoding any one or more of the methods or functions described herein, including instructions encoding the domain decommissioning module 117 of FIG. 1 for implementing method 300 of FIG. 3 or method 400 of FIG. 4.

Instructions 626 may also reside, completely or partially, within volatile memory 604 and/or within processing device 602 during execution thereof by computer system 600, hence, volatile memory 604 and processing device 602 may also constitute machine-readable storage media.

While non-transitory computer-readable storage medium 624 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "selecting," "determining," "deleting," "removing," "identifying," "generating" or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform method 300 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
    selecting, by a processing device, a storage domain to decommission from a storage system, wherein the storage domain comprises a plurality of disk images;
    determining, by the processing device, whether the disk images are associated with a virtual machine;
    hot-unplugging, by the processing device, the disk images from the virtual machine in view of a classification of the virtual machine, wherein the classification indicates whether the disk images are in a locked status with respect to a lease held on one or more of the disk images, wherein the lease comprises an expiration time period, and wherein the disk images are hot-unplugged from the virtual machine in view of the expiration time period;
    responsive to detecting that the disk images are hot-unplugged from the virtual machine, deleting the disk images from the storage domain; and
    removing, by the processing device, the storage domain from the storage system.

2. The method of claim 1, wherein the hot-unplugging of the disk images further comprises:
    receiving a failure alert indicating that the hot-unplugging of the disk images from the virtual machine failed; and
    responsive to detecting the failure alert, providing a prompt to request that the virtual machine is shut down.

3. The method of claim 2, wherein responsive to determining that at least one disk image of the plurality of disk images is associated with an active virtual machine, transmitting a request to continue or stop decommissioning of the storage domain.

4. The method of claim 3, wherein the hot-unplugging of the disk images comprises executing an instruction to block the active virtual machine from writing data to the disk images.

5. The method of claim 1, wherein the hot-unplugging of the disk images comprises un-mounting the disk images from the virtual machine.

6. The method of claim 1, wherein the deleting of the disk images comprises deleting a reference to the disk images from metadata associated with the storage domain.

7. The method of claim 1, wherein removing the storage domain comprises removing a reference to the storage domain from a database associated with the storage system.

8. A system comprising:
    a memory device; and
    a processing device, operatively coupled to the memory device, to:
    select a storage domain to decommission from a storage system, wherein the storage domain comprises a plurality of disk images;
    determine whether the disk images are associated with a virtual machine;

hot-unplug the disk images from the virtual machine in view of a classification of the virtual machine, wherein the classification indicates whether the disk images are in a locked status with respect to a lease held on one or more of the disk images, wherein the lease comprises an expiration time period, and wherein the disk images are hot-unplugged from the virtual machine in view of the expiration time period;

responsive to detecting that the disk images are hot-unplugged from the virtual machine, delete the disk images from the storage domain; and remove the storage domain from the storage system.

9. The system of claim 8, wherein to hot-unplug the disk images further comprises:

receive a failure alert indicating that the hot-unplugging of the disk images from the virtual machine failed; and responsive to detecting the failure alert, provide a prompt to request that the virtual machine is shut down.

10. The system of claim 9, wherein responsive to determining that at least one disk image of the plurality of disk images is associated with an active virtual machine, transmit a request to continue or stop decommissioning of the storage domain.

11. The system of claim 10, wherein to hot-unplug the disk images, the processing device is further to execute an instruction to block the active virtual machine from writing data to the disk images.

12. The system of claim 8, wherein to hot-unplug the disk images, the processing device is further to un-mount the disk images from the virtual machine.

13. The system of claim 8, wherein to delete the disk images, the processing device is further to delete a reference to the disk images from metadata associated with the storage domain.

14. The system of claim 8, wherein to remove the storage domain, the processing device is further to remove a reference to the storage domain from a database associated with the storage system.

15. A non-transitory computer-readable storage medium comprising executable instructions that, when executed by a processing device, cause the processing device to:

identify, by the processing device, a plurality of disk images on a storage domain to be decommissioned from a storage system;

group disk images of the plurality of disk images into a first category and second category, wherein the first category comprises a first set of disk images that are associated with an active virtual machine and the second category comprises a second set of disk images that are associated with a non-active virtual machine;

hot-unplug a disk image of at least one of the grouped disk images from a virtual machine in view of a classification of the virtual machine, wherein the classification indicates whether the disk images are in a locked status with respect to a lease held on one or more of the disk images, wherein the lease comprises an expiration time period, and wherein the disk images are hot-unplugged from the virtual machine in view of the expiration time period;

responsive to detecting that the disk image is associated with the first category:

generate a prompt to request that the active virtual machine is shut down; and delete the disk image from the storage domain.

16. The non-transitory computer-readable storage medium claim 15, wherein responsive to detecting that the disk image is associated with the active virtual machine, transmit a request to continue or stop decommissioning of the storage domain.

17. The non-transitory computer-readable storage medium claim 15, wherein the executable instructions further cause the processing device execute an instruction to block the active virtual machine from writing data to the disk image.

18. The non-transitory computer-readable storage medium claim 15, wherein to hot-unplug the disk image, the executable instructions further cause the processing device to un-mount the disk image from the virtual machine.

19. The non-transitory computer-readable storage medium claim 15, wherein to delete the disk image, the executable instructions further cause the processing device to delete an identifier reference to the disk image in metadata associated with the storage domain.

20. The non-transitory computer-readable storage medium claim 15, wherein responsive to detecting that the grouped disk images are unplugged from the storage domain, the executable instructions further cause the processing device to remove the storage domain from the storage system.

* * * * *